(12) United States Patent
Morishige et al.

(10) Patent No.: US 8,002,658 B2
(45) Date of Patent: Aug. 23, 2011

(54) CHAINS FOR POWER TRANSMISSION

(75) Inventors: Kouji Morishige, Nabari (JP); Timothy J. Ledvina, Salamanca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 478 days.

(21) Appl. No.: 12/271,986

(22) Filed: Nov. 17, 2008

(65) Prior Publication Data

US 2009/0124445 A1 May 14, 2009

Related U.S. Application Data

(63) Continuation-in-part of application No. 10/925,322, filed on Aug. 24, 2004, now Pat. No. 7,452,295.

(30) Foreign Application Priority Data

Sep. 3, 2003 (JP) .................................. 2003-311284

(51) Int. Cl.
*F16G 13/02* (2006.01)
(52) U.S. Cl. ......... 474/206; 474/221; 474/219; 474/220
(58) Field of Classification Search .................. 474/201, 474/206, 214, 215, 216, 219, 220, 221, 223, 474/224
See application file for complete search history.

(56) References Cited

U.S. PATENT DOCUMENTS

| | | | |
|---|---|---|---|
| 580,449 A | 4/1897 | Caldwell | |
| 617,716 A | 1/1899 | Caldwell | |
| 992,740 A | 5/1911 | Taylor | |
| 1,239,232 A | 9/1917 | Taylor | |
| 1,933,653 A | 11/1933 | Bremer | |
| 1,939,986 A | 12/1933 | Klaucke | |
| 1,947,421 A | 2/1934 | Mize | |
| 2,130,063 A | 9/1938 | Bryant | |
| 2,231,380 A | 2/1941 | Belcher | |
| 2,466,639 A | 4/1949 | Focke et al. | |
| 2,557,963 A | 6/1951 | Hapman | |
| 2,638,790 A | 5/1953 | Perron | |
| 3,351,252 A | 11/1967 | Singley et al. | |
| 3,353,421 A | 11/1967 | Ketterle et al. | |
| 3,885,445 A * | 5/1975 | Montano | 474/218 |
| 6,558,281 B1 | 5/2003 | Greiter | |
| 6,824,484 B2 | 11/2004 | Greiter | |
| 2005/0049099 A1 | 3/2005 | Morishige | |

FOREIGN PATENT DOCUMENTS

| | | |
|---|---|---|
| DE | 3048797 A1 | 7/1982 |
| JP | 55-34580 A | 8/1953 |
| JP | 06033993 A | 2/1994 |
| JP | 07317845 A | 12/1995 |

* cited by examiner

*Primary Examiner* — Emmanuel M Marcelo
(74) *Attorney, Agent, or Firm* — Brown & Michaels, PC

(57) ABSTRACT

A power transmission chain includes a plurality of links and a bending-restraining mechanism. The bending-restraining mechanism includes a wire extending in a lengthwise direction along the chain and engaging at least three adjacent joints of the chain. The wire is formed such that it elastically deforms when an inside link rotates around the inner joint in a first direction from a linearly extending state, the wire thereby applying a bending resistance to the inside link during articulation of the chain. In one embodiment, the wire includes at least one curved section clipped around at least a majority of a circumference of at least one joint. In another embodiment, the wire is formed such that a predetermined bias due to a bending deformation of the wire is applied to the inside link when the chain is extended linearly.

25 Claims, 7 Drawing Sheets

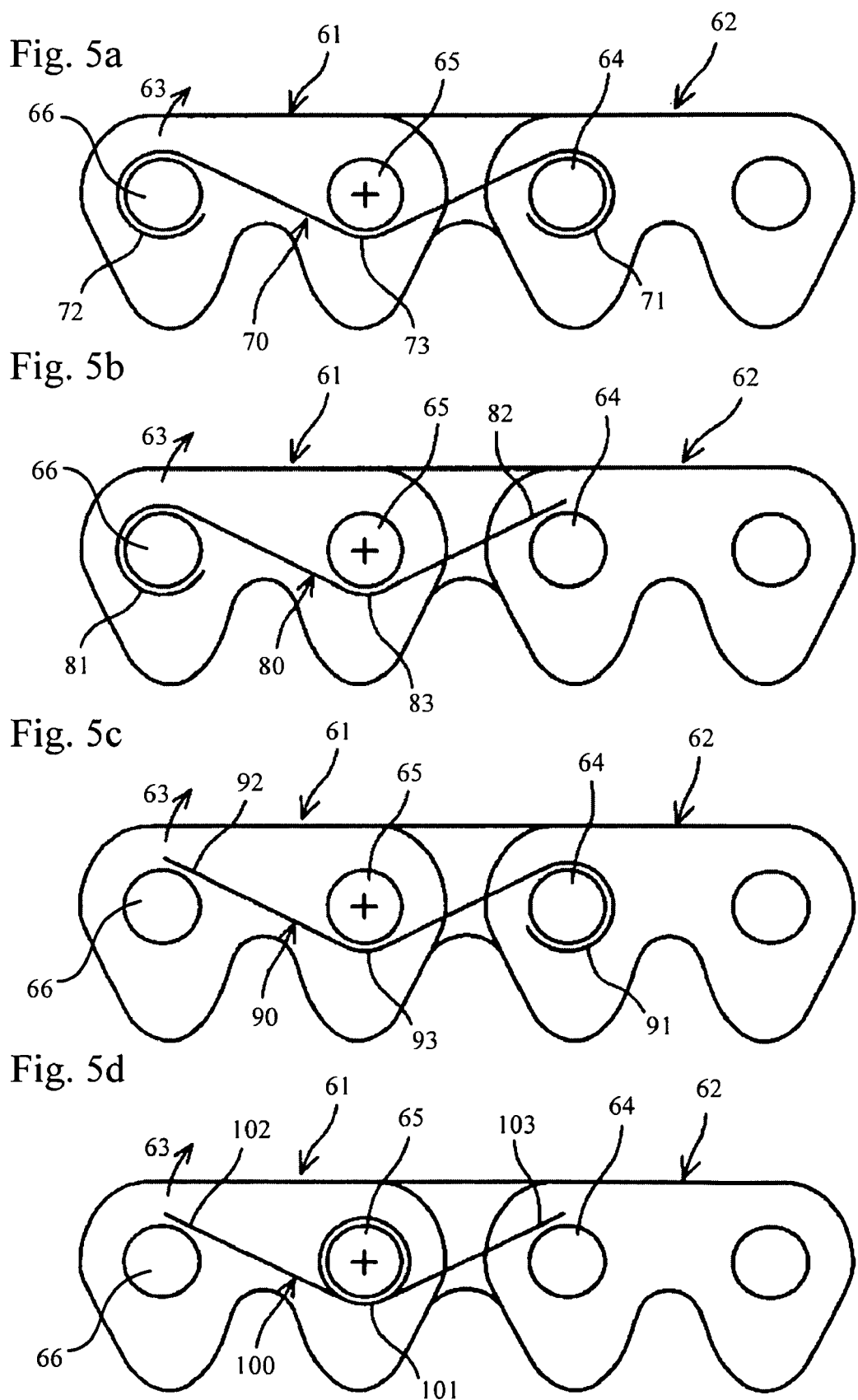

CHAINS FOR POWER TRANSMISSION

REFERENCE TO RELATED APPLICATIONS

This is a continuation-in-part patent application of co-pending application Ser. No. 10/925,322, filed Aug. 24, 2004, entitled "CHAINS FOR POWER TRANSMISSION", which claims one or more inventions which were disclosed in Japanese application number 2003-311284, filed Sep. 3, 2003, entitled "CHAINS FOR POWER TRANSMISSION". The benefit under 35 USC§119(a) of the Japanese application is hereby claimed, and the aforementioned applications are hereby incorporated herein by reference.

BACKGROUND OF THE INVENTION

1. Field of the Invention

The invention pertains to the field of chains. More particularly, the invention pertains to a structure for restraining chordal oscillation of a chain.

2. Description of Related Art

A power transmission chain for use in an automobile or motorcycle is generally constructed from multiple links that are connected endlessly by connecting pins inserted into pin apertures of the links. In the operation of a power transmission chain, when the engagement frequency, determined by the number of teeth and the rotational speed of a sprocket around which a chain is wrapped, coincides with the resonance frequency of a chain, determined by the length of a chain span and chain tension, resonance occurs in the chain span and the span oscillates severely in a lateral direction.

Various efforts have been made in the prior art to prevent such resonant oscillation of a chain span. Leaf springs are commonly used to apply a biased force along the length of the connecting pin perpendicular to the direction of articulation of the chain. This spring force causes frictional resistance to any bending motion of the chain. While the leaf spring may successfully control resonant oscillations of the chain, it also increases frictional losses during articulation of the chain, thereby making it less efficient in transferring power between sprockets.

Japanese patent application laid-open publication No. 55-34580 (JP55-34580) discloses two adjacent connecting pins of two adjacent links that are coupled to each other via a leaf spring in order to decrease the engagement collision sound of a roller chain. JP55-34580 describes that the links articulate against the spring force of a leaf spring at the time of articulating motion of the adjacent links, thereby restraining rapid articulation of the links during the engagement with the sprocket teeth to decrease the engagement collision sound. Also, in this case, chordal oscillation of a chain span may be restrained due to the restriction of articulating motion of the links.

However, in this prior art structure, since opposite end portions of the leaf spring need to be fixedly attached to the end portions of the connecting pins, the end portions of the connecting pins require caulking, thereby making the assembly work troublesome. Moreover, the width of a chain is increased by the width of the leaf spring. Also, JP55-34580 discloses the use of a torsional coil spring to decrease the width of a chain. However, in this case, each connecting pin requires a torsional coil spring, thereby making the structure and the assembly work complicated and troublesome.

The present invention simplifies the structure for restraining chordal oscillation of a chain span of a power transmission chain while minimizing frictional losses and simplifying the assembly work of the chain.

SUMMARY OF THE INVENTION

A power transmission chain of the present invention includes a plurality of links and a bending-restraining mechanism. Each link includes a pair of pin apertures connected to each other by at least one connecting pin inserted into each of the pin apertures, thereby forming a joint. The bending-restraining mechanism includes a wire extending in a lengthwise direction along the chain and engaging at least three adjacent joints of the chain comprising an inner joint and a pair of outer joints. The wire is formed such that it elastically deforms when an inside link rotates around the inner joint in a first direction from a linearly extending state, the wire thereby applying a bending resistance to the inside link during articulation of the chain.

In one embodiment, the wire includes a curved section clipped around at least a majority of a circumference of at least one of the at least three adjacent joints.

In another embodiment, the wire is further formed such that a predetermined bias due to a bending deformation of the wire is applied to the inside link when the chain is extended linearly.

BRIEF DESCRIPTION OF THE DRAWINGS

FIG. 5a shows a side view of a portion of a silent chain in a fifth embodiment of the present invention, corresponding to the view of FIG. 3.

FIG. 5b shows a side view of a portion of a silent chain in a sixth embodiment of the present invention, corresponding to the view of FIG. 4a.

FIG. 5c shows a side view of a portion of a silent chain in a seventh embodiment of the present invention, corresponding to the view of FIG. 4b.

FIG. 5d shows a side view of a portion of a silent chain in an eighth embodiment of the present invention, corresponding to the view of FIG. 4c.

FIG. 6c shows a side view of a portion of a silent chain in an eleventh embodiment of the present invention, corresponding to the view of FIG. 6a.

FIG. 6d shows a side view of a portion of a silent chain in a twelfth embodiment of the present invention, corresponding to the view of FIG. 6a.

FIG. 6e shows a side view of a portion of a silent chain in a thirteenth embodiment of the present invention, corresponding to the view of FIG. 6a.

DETAILED DESCRIPTION OF THE INVENTION

A power transmission chain of the present invention includes a plurality of links. Each of the links has a pair of pin apertures, which are connected to each other by connecting pins inserted into the pin apertures to form joints. At least three adjacent joints include a wire extending substantially in a lengthwise direction along the chain. The wire is engaged with the joints in such a way that bending resistance due to bending deformation of the wire is applied to the chain during articulation of the chain. The bending deformation is preferably an elastic deformation. The wire preferably does not impose a lateral force on the chain or increase frictional losses when the chain bends at a joint. The primary forces applied by the wire to the chain are forces applied to one or more joints as a result of bending of the wire along its length and are therefore in directions perpendicular to the axes of the connecting pins. The force applied to the wire during bending deformation is stored as energy at least in part in the wire until it is released during restoration of the link or links toward a linearly extending state of the chain.

During operation of the power transmission, since the bending resistance due to bending deformation of the wire is imparted to the chain during articulation of a chain, lateral oscillations of a chain span are controlled, thereby restraining chordal oscillations of the chain span. A bending-restraining mechanism preferably includes a wire extending across at least three adjacent joints, which eliminates the necessity for providing each respective joint with a bending-restraining mechanism. As a result, the number of components of the chain is reduced, which simplifies both the structure and the assembly work of the chain.

In some embodiments, the wire is disposed in a zigzag pattern at the joints along the length of the chain, and at least one end of the wire is wrapped around a corresponding joint. In this case, the opposite ends of the wire may both be wrapped around their corresponding joints.

In other embodiments of the present invention, the wire is disposed in a zigzag pattern at the joints along the length of the chain, and an intermediate portion of the wire is wrapped around an intermediate joint. In these embodiments, a portion of the wire may be wrapped around the joint disposed adjacent to the outermost joint.

In some embodiments, the wire engages all or substantially all of the joints of the chain. The wire may be continuous around the chain or may have ends that are either linear or wrapped around joints. The joints of the chain may each include a single connecting pin or a pair of rocker pins.

Figure 1:
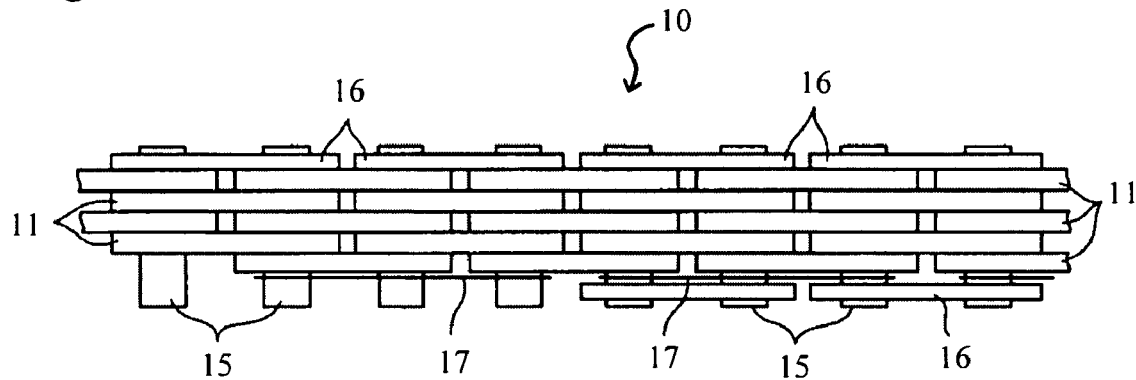
FIG. 1 shows a top plan view of a portion of a silent chain in a first embodiment of the present invention.
Figure 2:
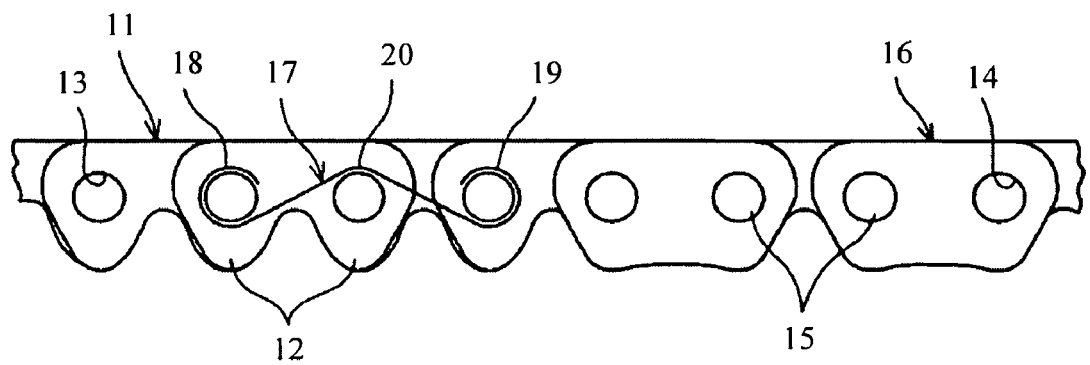
FIG. 2 shows a side view of a portion of the silent chain of FIG. 1.
Figure 3:
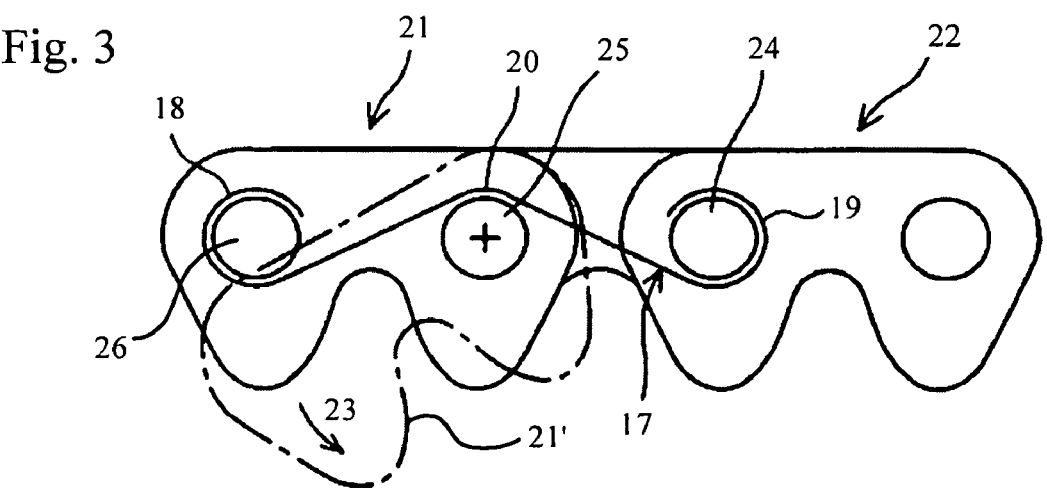
FIG. 3 shows an enlarged view of a portion of a silent chain of FIG. 2, illustrating the movement of a wire during articulating motion of links.

FIGS. 1-3 show a first embodiment of the present invention. As shown in FIGS. 1 and 2, a silent chain 10 is constructed from a plurality of rows of interleaved inside links 11, each having a pair of teeth 12 and pin apertures 13, pivotably connected to each other by connecting pins 15 inserted into the pin apertures 13. The silent chain 10 also has outside links 16 with pin apertures 14 and disposed outside the outermost inside links 11 and fixedly connected to the ends of the connecting pins 15. Alternatively, the connecting pins 15 may be pairs of rocker pins in each pin aperture 13 to form each joint.

In the embodiment of FIGS. 1-3, on one side of the chain 10, a wire 17 is provided between the outermost inside link 11 and the outside link 16, although wires may be used on either or both sides of the chain within the spirit of the present invention. The wire 17 is sandwiched between the outermost inside link 11 and the outside link 16 disposed adjacent to each other to prevent the wire from falling out of the chain 10. In a preferred embodiment, the wire 17 is formed of spring steel, preferably piano wire.

In this embodiment, the wire 17 extends across three adjacent connecting pins 15 or joints that are disposed adjacent to each other along the length of the chain 10. Annular hook portions 18, 19 are formed at opposite ends of the wire 17. During assembly, either the ends of the connecting pins 15 are inserted into the corresponding hook portions 18, 19, or the hook portions 18, 19 are slipped around the connecting pins 15. In other words, each end portion of the wire 17 wraps or hooks around the corresponding connecting pin 15. In either case, the hook portions 18, 19 are not fixedly attached to the corresponding connecting pins 15 so that each connecting pin 15 is freely rotatable relative to the hook portion 18, 19. Also, a central portion 20 of the wire 17 is bent in a flat, inverted V-shape, which is engaged with a central connecting pin 25.

The wire 20 may be formed such that at a linearly extending state of the chain as shown in FIGS. 1 and 2, the wire 17 is not elastically deformed and spring force of the wire 17 is not applied to the inside links 11, or the wire may be formed such that one or more of the inside links is biased toward either inward or outward rotation at a linearly extending state of the chain.

The operation of the wire 17 is explained in accordance with FIG. 3. FIG. 3 shows adjacent inside links 11 (21, 22) of FIG. 2 that have a wire 17 disposed thereon. As the inside link 21 rotates around the connecting pin 25 in the direction of an arrow marked 23 from the position 21 to the position 21', as shown in FIG. 3, the wire 17 elastically deforms because one end of the wire 17 is engaged with the connecting pin 24 of the inside link 22 and the intermediate portion of the wire 17 is engaged with the connecting pin 25 from above. Thereby, bending resistance due to bending deformation of the wire 17 is applied to the inside link 21.

Bending resistance of the wire 17 is imparted to the chain 10 at the time of inwardly articulating motion of the inside link 21. Thus, chordal oscillation caused by the outward movement of a chain span between the sprockets may be restrained. Also, at the time of engagement with the sprocket, bending resistance is applied to the chain when the inside links articulate in the direction of the engagement with the sprocket. Therefore, the inside links may be restrained from impacting the sprocket teeth during engagement with the sprocket, thereby reducing the impact sound.

Furthermore, a bending-restraining mechanism that restrains bending of the inside links 21, 22 is constructed from a wire 17 extending across three connecting pins 24, 25, 26, which eliminates the necessity for providing each respective connecting pin with a bending-restraining mechanism. As a result, the structure of the chain and the assembly work thereof are simplified.

Additionally, as the inside link 21 articulates or pivots around the connecting pin 25 in the direction opposite the direction of the arrow marked 23, the wire 17 rotates around the connecting pin 24 of the inside link 22 and it does not apply a bending resistance to the inside link 21.

Figure 4A:
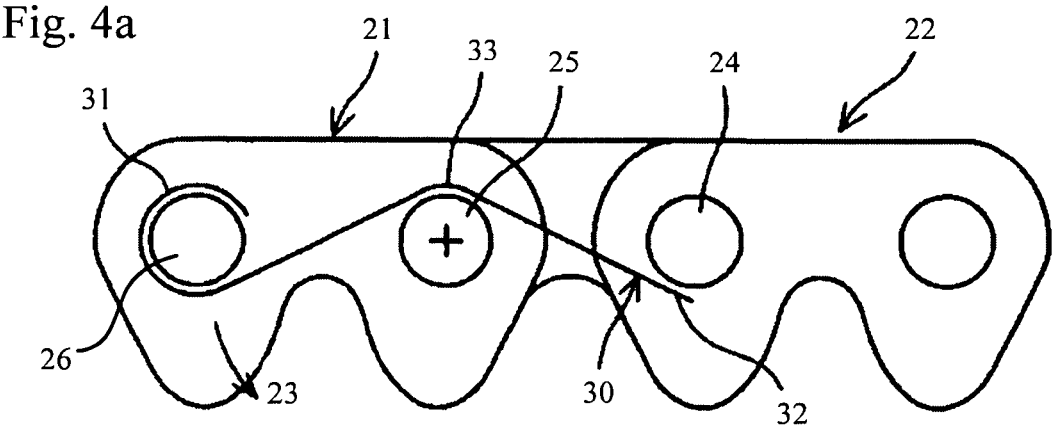
FIG. 4a shows a side view of a portion of a silent chain in a second embodiment of the present invention, corresponding to the view of FIG. 3 for the first embodiment.
Figure 4B:
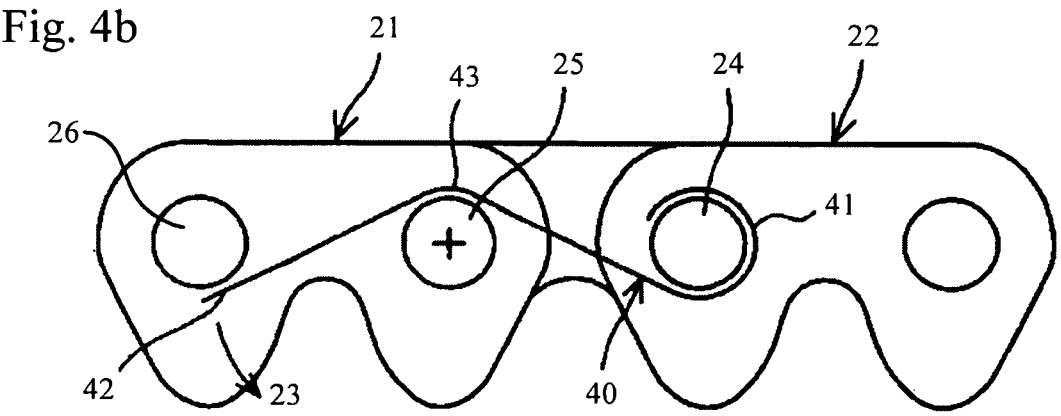
FIG. 4b shows a side view of a portion of a silent chain in a third embodiment of the present invention, corresponding to the view of FIG. 3.
Figure 4C:
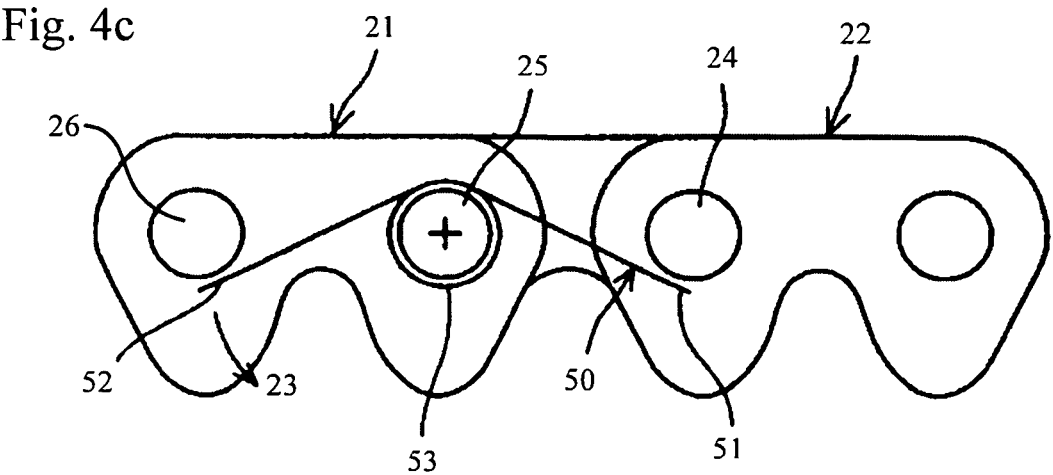
FIG. 4c shows a side view of a portion of a silent chain in a fourth embodiment of the present invention, corresponding to the view of FIG. 3.

FIGS. 4a-4c show additional embodiments of the present invention, where a wire engages three connecting pins while extending from the upper part of the middle of the three connecting pins. In FIG. 4a, the wire 30 is wrapped or hooked around the connecting pin 26 on only one end 31 and the other end 32 of the wire 30 extends linearly. A linearly extending end portion 32 of the wire 30 extends below the connecting pin 24. A central portion 33 of the wire 30 is bent in a flat, inverted V-shape, which is engaged with a central connecting pin 25.

In FIG. 4b, as in FIG. 4a, the wire 40 is wrapped or hooked around the connecting pin 24 on only one end 41 and the other end of the wire 40 extends linearly. However, in this case, a linearly extending end portion 42 of the wire 40 extends below the connecting pin 26. Again, a central portion 43 of the wire 40 is bent in a flat, inverted V-shape, which is engaged with a central connecting pin 25.

In FIG. 4c, the wire 50 extends linearly on both ends 51, 52 without being wrapped around the connecting pins 24, 26, respectively. In this case, a loop portion 53 is formed at a central portion of the wire 50, which is wrapped around the central connecting pin 25.

Similar to the embodiment of FIGS. 1-3, according to the embodiments of FIGS. 4a-4c, as the inside link 21 rotates around the connecting pin 25 in the direction of an arrow marked 23, the wire 30, 40, 50 elastically deforms because one end 32, 41, 51 of the wire 30, 40, 50, respectively, is engaged with the connecting pin 24 of the inside link 22 and the intermediate portion 33, 43, 53 of the wire 30, 40, 50, respectively, is engaged with the central connecting pin 25. Thereby, bending resistance due to bending deformation of the wire 30, 40, 50 is applied to the inside link 21.

As with the first embodiment, bending resistance by the wire 30, 40, 50 is imparted to the chain at the time of inwardly articulating motion of the inside link 21. Thus, chordal oscillation caused by the outward movement of a chain span is restrained. Also, at the time of engagement with the sprocket, bending resistance is applied to the chain when the inside links articulate in the direction of the engagement with the sprocket. Therefore, the inside links may be restrained from impacting the sprocket teeth during engagement with the sprocket, thereby reducing the impact sound.

Furthermore, a bending-restraining mechanism that restrains bending of the inside links is constructed from a wire 30, 40, 50 extending across three connecting pins 24, 25, 26, which eliminates the necessity for providing each respective connecting pin with a bending-restraining mechanism. As a result, the structure of the chain and the assembly work thereof are simplified.

Additionally, as the inside link 21 articulates or pivots around the connecting pin 25 in the direction opposite the direction of the arrow marked 23, the wire 30 moves away from the connecting pin 24 of the inside link 22 (FIG. 4a) or the wire 40, 50 maintains its position (FIGS. 4b and 4c). Therefore, the wire 30, 40, 50 does not apply a bending resistance to the inside link 21 during rotation in this direction.

In the previously discussed embodiments, the central portion of the wire 17, 30, 40, 50 extends over the central connecting pin 25 but the present invention is not limited to these embodiments. The central portion of the wire may extend under the connecting pin. FIGS. 5a-5d show such embodiments of the present invention. In FIGS. 5a-5c, the central portion 73, 83, 93 of the wire 70, 80, 90, respectively is bent in a flat, V-shape and engaged with the central connecting pin 65 from below rather than from above, as in FIG. 3, FIG. 4a, and FIG. 4b. The embodiment of FIG. 5a corresponds to the embodiment of FIG. 3 and FIGS. 5b, 5c, and 5d correspond to FIGS. 4a, 4b, and 4c, respectively.

In FIG. 5a, annular hook portions 71, 72 at opposite ends of the wire 70 are wrapped around the corresponding connecting pins 64, 66. As the inside link 61 rotates around the connecting pin 65 in the direction of an arrow marked 63 from the state shown in FIG. 5a, the wire 70 elastically deforms because one end 71 of the wire 70 is engaged with the connecting pin 64 of the inside link 62 and the intermediate portion 73 of the wire 70 is engaged with the connecting pin 65 from below. Thereby, bending resistance due to bending deformation of the wire 70 is applied to the inside link 61.

Since bending resistance by the wire 70 is imparted to the chain at the time of outwardly articulating motion of the inside link 61, chordal oscillation caused by the inward movement of a chain span between the sprockets is restrained.

Additionally, as the inside link 61 articulates or pivots around the connecting pin 65 in the direction opposite the direction of the arrow marked 63, the wire 70 rotates around the connecting pin 64 of the inside link 62 and it does not apply a bending resistance to the inside link 61.

In FIG. 5b, only one end 81 of the wire 80 is wrapped or hooked around a connecting pin 66 and the other end 82 of the wire 80 extends linearly. That is, a linearly extending end portion 82 of the wire 80 extends above the connecting pin 64.

In FIG. 5c, as with FIG. 5b, only one end 91 of the wire 90 is wrapped or hooked around a connecting pin 64 and the other end 92 of the wire 90 extends linearly. However, in this case, the end portion 92 extends linearly above the connecting pin 66.

In FIG. 5d, neither end 102, 103 of the wire 100 is wrapped around the connecting pins 66, 64, respectively. Instead, both extend linearly. In this case, a loop portion 101 is formed at a central portion of the wire 100, which is wrapped around the central connecting pin 65.

According to the embodiments of FIGS. 5a-5d, as the inside link 61 rotates around the connecting pin 65 in the direction of an arrow marked 63, the wire 70, 80, 90, 100 elastically deforms because one end 71, 82, 91, 103 of the wire 70, 80, 90, 100, respectively, is engaged with the connecting pin 64 of the inside link 62 and the intermediate portion 73, 83, 93, 101 of the wire 70, 80, 90, 100, respectively, is engaged with the connecting pin 65 from below. Thereby, bending resistance due to bending deformation of the wire 70, 80, 90, 100 is applied to the inside link 61.

Bending resistance by the wire 70, 80, 90, 100 is imparted to the chain at the time of outwardly articulating motion of the inside link 61. Thus, chordal oscillation caused by the inward movement of a chain span between the sprockets is restrained.

Additionally, as the inside link 61 articulates or pivots around the connecting pin 65 in the direction opposite the direction of the arrow marked 63, the wire 70 rotates around the connecting pin 64 of the inside link 62 (FIG. 5a), the wire 80 moves away from the connecting pin 64 of the inside link 62 (FIG. 5b), or the wire 90, 100 maintains its position (FIGS. 5c and 5d) and the wire 70, 80, 90, 100 itself does not apply a bending resistance to the inside link 61.

In the embodiments of FIG. 1 through FIG. 5d, a wire spans three connecting pins 24, 25, 26 and 64, 65, 66, but the present invention may be applied to a case where a wire spans four or more connecting pins. FIGS. 6a-6e shows embodiments where the wire spans four connecting pins. In FIGS. 6a-6e, only the connecting pins 111, 112, 113, 114 and the wire 120, 130, 140, 150, 155 are shown, and the link plates are removed for illustrative purposes.

Figure 6A:
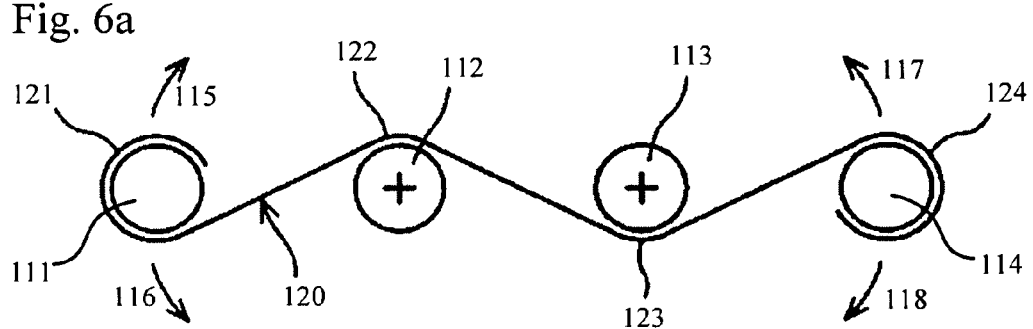
FIG. 6a shows a side view of a portion of a silent chain in a ninth embodiment of the present invention with only the wire and the joints.
Figure 6B:
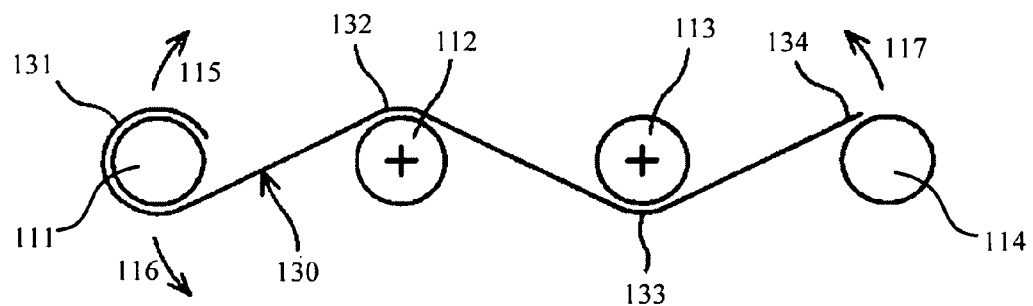
FIG. 6b shows a side view of a portion of a silent chain in a tenth embodiment of the present invention, corresponding to the view of FIG. 6a for the ninth embodiment.
Figure 6C:
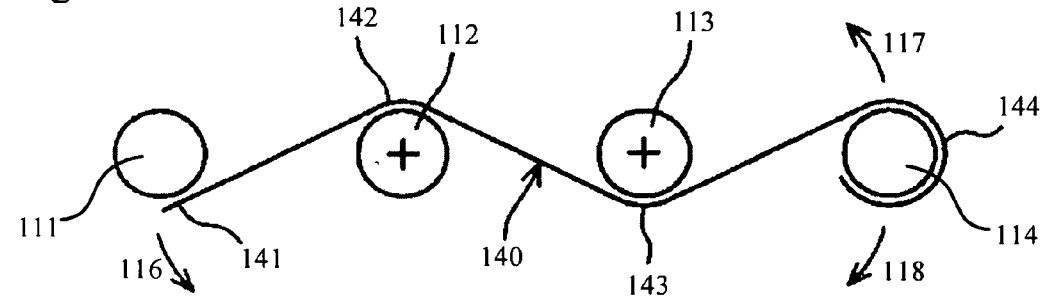

In any of the embodiments of FIGS. 6a-6c, the intermediate portion 122, 132, 142 of the wire 120, 130, 140, respectively, is bent in a flat, inverted V-shape and engaged with the connecting pin 112 from above. The intermediate portion 123, 133, 143 of the wire 120, 130, 140, respectively, is bent in a flat, V-shape and engaged with the connecting pin 113 from below. That is, the wire 120, 130, 140 is bent upwardly and downwardly between the connecting pins 112, 113 on the opposite sides and forms a zigzag pattern along the length of the chain. In this state, the wire 120, 130, 140 is preferably not elastically deformed and no spring force of the wire 120, 130, 140 is applied to the inside links.

In FIG. 6a, opposite end portions 121, 124 of the wire 120 are wrapped around the corresponding connecting pins 111, 114. In FIG. 6b, only one end portion 131 of the wire 130 is wrapped or hooked around a connecting pin 111 and the opposite end portion 134 of the wire 130 is formed linearly and extends above a connecting pin 114.

In FIG. 6c, similar to FIG. 6b, only one end portion 144 of the wire 140 is wrapped or hooked around a connecting pin 114 and the opposite end portion 141 of the wire 140 is formed linearly and extends below a connecting pin 111.

Figure 6D:
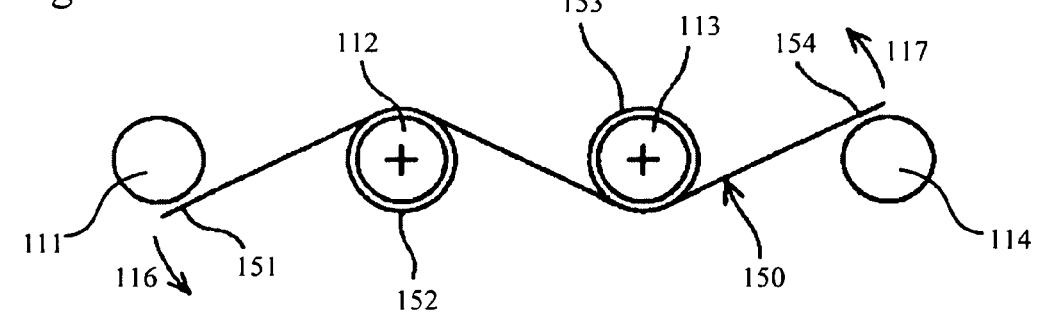

In FIG. 6d, both ends 151, 154 of the wire 150 are formed linearly without being hooked around the connecting pins 111, 114, respectively. Also, hook portions 152, 153 are formed at intermediate portions of the wire 150. One hook portion 152 is wrapped around the connecting pin 112 and the second hook portion 153 is wrapped around the connecting pin 113. In other words, a portion of the wire 150 is wrapped around the connecting pins disposed adjacent to the outermost connecting pins.

Figure 6E:
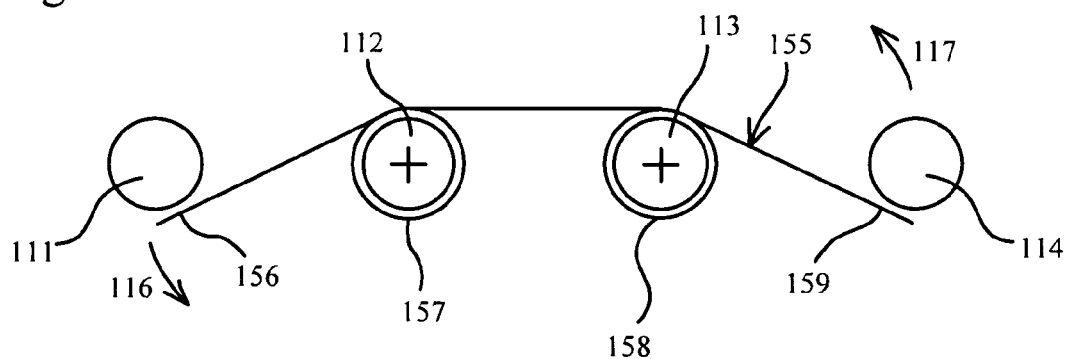

In FIG. 6e, similar to FIG. 6d, both ends 156, 159 of the wire 155 are formed linearly without being hooked around the connecting pins 111, 114, respectively. Also, hook portions 157, 158 are formed at intermediate portions of the wire 150. One hook portion 157 is wrapped around the connecting pin 112 and the second hook portion 158 is wrapped around the connecting pin 113. In contrast to the embodiment of FIG. 6d, where one hook 152 is clockwise and the other 153 is counterclockwise, in FIG. 6e, both hooks 157, 158 wrap clockwise around their respective connecting pins such that end 159 is below pin 114 as end 151 is below pin 111.

According to the embodiment shown in FIG. 6a, when an inside link rotates around the connecting pin 112 in either direction designated by the arrows marked 115 and 116, the wire 120 elastically deforms. Thereby, bending resistance due to bending deformation of the wire 120 is applied to the inside link. Similarly, when an inside link rotates around the connecting pin 113 in either direction designated by the arrows marked 117 and 118, the wire 120 elastically deforms. Thereby, bending resistance due to bending deformation of the wire 120 is applied to the inside link.

At the time of both inward and outward articulating motions of an inside link, bending resistance by the wire 120 is applied to the chain. Thereby, chordal oscillation by both the inward and outward movement of a chain span may be restrained. Also, the impact sound at the time of engagement with the sprocket may be reduced.

Moreover, a bending-restraining mechanism to restrain the bending of inside links is formed by the wire 120 that spans four connecting pins 111, 112, 113, 114, thereby further simplifying the structure and assembly work.

According to the embodiment shown in FIG. 6b, when an inside link rotates around the connecting pin 112 in either direction designated by the arrows marked 115 and 116, the wire 130 elastically deforms. Thereby, bending resistance due to bending deformation of the wire 130 is applied to the inside link. On the other hand, when an inside link rotates around the connecting pin 113 in the direction designated by the arrow marked 117, the wire 130 elastically deforms and bending resistance due to bending deformation of the wire 130 is applied to the inside link. However, when an inside link rotates around the connecting pin 113 in the direction opposite the direction designated by the arrow marked 117, the wire 130 substantially maintains its position and does not apply a bending resistance to the inside link.

In the embodiment of FIG. 6c, when an inside link rotates around the connecting pin 113 in either direction designated by the arrows marked 117 and 118, the wire 140 elastically deforms. Thereby, bending resistance due to bending deformation of the wire 140 is applied to the inside link. On the other hand, when an inside link rotates around the connecting pin 112 in the direction designated by the arrow marked 116, the wire 140 elastically deforms and bending resistance due to bending deformation of the wire 140 is applied to the inside link. However, when an inside link rotates around the connecting pin 112 in the direction opposite the direction designated by the arrow marked 116, the wire 140 substantially maintains its position and does not apply a bending resistance to the inside link.

According to the embodiment shown in FIG. 6d, when an inside link rotates around the connecting pin 112 in the direction designated by the arrow marked 116, the wire 150 elastically deforms. Thereby, bending resistance due to bending deformation of the wire 150 is applied to the inside link. When an inside link rotates around the connecting pin 112 in the direction opposite the direction designated by the arrow marked 116, the wire 150 substantially maintains its position and does not apply a bending resistance to the inside link. On the other hand, when an inside link rotates around the connecting pin 114 in the direction designated by the arrow marked 117, the wire 150 elastically deforms and bending resistance due to bending deformation of the wire 150 is applied to the inside link. When an inside link rotates around the connecting pin 113 in the direction opposite the direction designated by the arrow marked 117, the wire 150 substantially maintains its position and does not apply a bending resistance to the inside link.

According to the embodiments shown in FIGS. 6a-6d, since bending resistance by the wire 120, 130, 140, 150 is imparted to the chain at the time of inward or outward articulating motion of inside links, chordal oscillation by the inward or outward movement of a chain span may be restrained. Moreover, a bending-restraining mechanism to restrain the bending of inside links is formed by a wire 120, 130, 140, 150 that spans four connecting pins 111, 112, 113, 114, thereby further simplifying the structure and assembly work.

According to the embodiment shown in FIG. 6e, motion of the end links inwardly causes elastic deflection of the wire 155 and restrains the section of chain formed by pins 111, 112, 113 and 114 from moving outward in the chain strand between the sprockets. Motion of the end links in the opposite direction 117 encounters no such restriction. This may be advantageous in some circumstances where it is desirable to prevent that motion in controlling tight strand vibration. It should also be noted that the wire 120, 130, 140, 150, 155 in each of the embodiments shown in FIGS. 6a-6e may be turned upside down such that section 112 resides below pin 112 in FIG. 6a and still function in a useful manner.

In the embodiments of FIG. 1 through FIG. 6e, the wire may be pre-deformed in the zigzag pattern around the connecting pins of the linearly-extended chain as shown in the figures such that when the chain is extended linearly, the wire is not elastically deformed and thus bending resistance due to bending deformation of the wire is not applied to the inside link. When the inside link begins to rotate or articulate around the connecting pin, bending resistance due to bending deformation of the wire is applied to the inside link. Alternatively, the wire may be pre-formed such that a predetermined bias due to bending deformation of the wire is applied to the inside link when the chain is extended linearly in the form of a pre-load. This pre-load may be tuned to provide the predetermined bias applied to the inside link. Increasing the pre-load increases the bending resistance but also increases the tension in the linearly extended chain.

Figure 7:
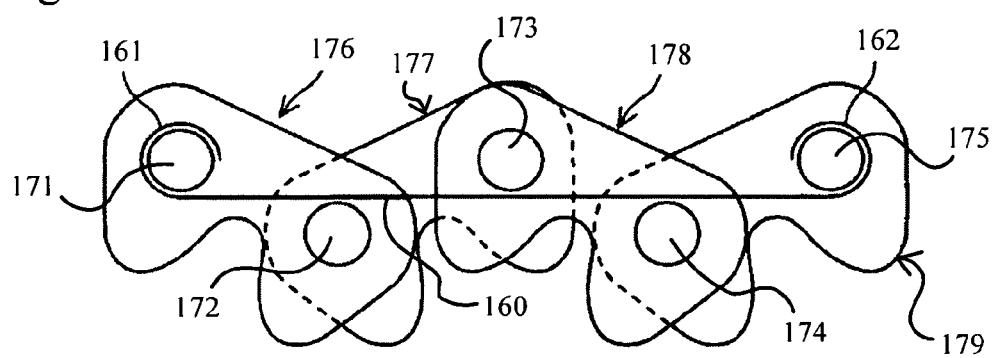
FIG. 7 shows a side view of a portion of a silent chain in a fourteenth embodiment of the present invention.

FIG. 7 shows another embodiment of the present invention. In this embodiment, a linearly extending wire 160 is engaged with each of five connecting pins 171, 172, 173, 174, 175. Annular hook portions 161, 162 at opposite ends of the wire 160 are wrapped around the corresponding connecting pins 171, 175, respectively. In this embodiment, without tension in the chain, the inside links 176, 177, 178, 179 are disposed in a zigzag pattern as shown in FIG. 7. When the chain is wrapped around a drive sprocket and a driven sprocket, the wire elastically deforms to impart bending resistance to the inside links. Regarding this embodiment, it should be noted that the path of the wire 160 significantly increases when the chain span is in a linearly-extended state relative to the state shown in FIG. 7. Therefore, slack may be provided between the hook portions or the hook portions make be longer than in other embodiments in order to be able to unravel to account for the increased distance of travel of the wire in the zigzag configuration of the linearly-extended state. Alternatively, the wire may be pre-deformed in a zigzag pattern around the connecting pins of the linearly-extended chain such that when the chain is extended linearly, the wire is not elastically deformed and thus bending resistance due to bending deformation of the wire is not applied to the inside links.

In this embodiment, since bending resistance by the wire 160 is imparted to the chain during inward or outward articulating motion of the inside link 176, 178, chordal oscillation by the inward or outward movement of the chain span may be restrained. Moreover, a bending-restraining mechanism to restrain bending of the inside links 176, 178 is formed by the wire 160 that spans five connecting pins 171, 172, 173, 174, 175, thereby still further simplifying the structure and assembly work.

Any combination of wires in the embodiments of FIGS. 1-7 may be used in a single chain. Each connecting pin of the chain is preferably engaged with at least one wire of the present invention such that bending resistance is applied to each inside link by at least one wire.

Although the embodiments of FIGS. 1-7 include at least one wire engaging a subset of connecting pins of the chain, a single wire of the present invention may engage all or substantially all of the connecting pins of a chain, as shown in the embodiments of FIGS. 8-11. In the embodiments of FIGS. 8-11, the wire spring may be continuous without ends or may have its ends either linearly engaging or wrapped around the last connecting pins within the spirit of the present invention. Alternatively, the wire spring may engage a finite sub-set of the connecting pins, with multiple wire springs preferably used in combination to engage all or substantially all of the connecting pins of the chain.

Figure 8:
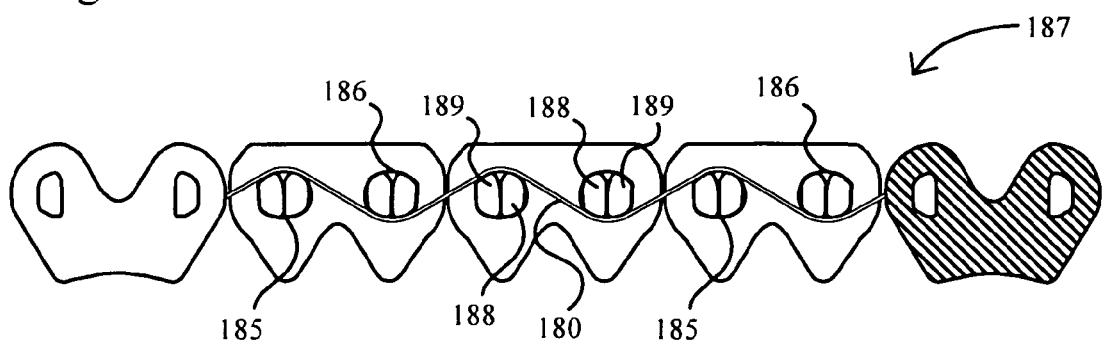
FIG. 8 shows a side view of a portion of a rocker chain in a fifteenth embodiment of the present invention.

FIG. 8 shows a wire spring 180 woven through the joints 185, 186 of the chain 187, where the wire spring 180 alternately goes over joints 185 and under joints 186 of the chain. Each joint 185, 186 includes a pair of rocker pins 188, 189. As the wire spring is woven through the connecting pins and hangs on the joints, it does not fall off the chain. The wire spring 180 may be pre-deformed in the zigzag pattern around the joints of the linearly-extended chain as shown in FIG. 8 such that when the chain is extended linearly, the wire is not elastically deformed and thus bending resistance due to bending deformation of the wire is not applied to the inside link. Alternatively, the wire may be pre-formed such that a predetermined bending resistance due to bending deformation of the wire is applied to the inside link when the chain is extended linearly in the form of a pre-load, or the wire spring may be linear when not elastically deformed, as in the embodiment of FIG. 7.

Figure 9:
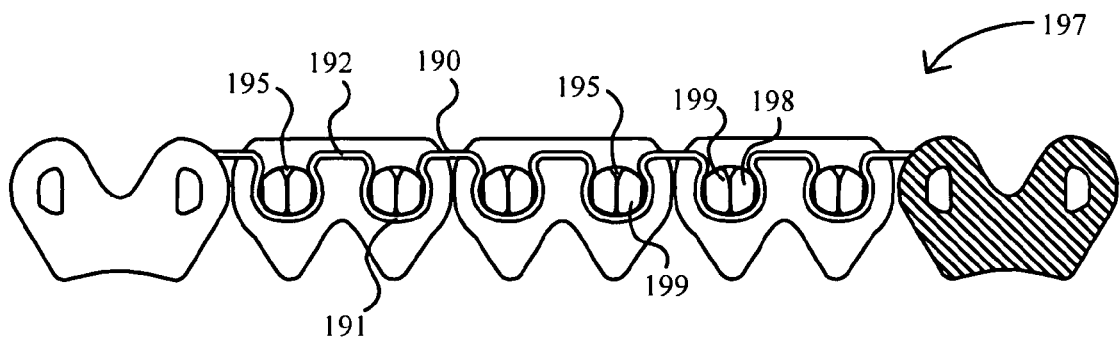
FIG. 9 shows a side view of a portion of a rocker chain in a sixteenth embodiment of the present invention.

FIG. 9 shows a wire 190 that is easier to install than the wire in FIG. 8. The wire 190 includes curved sections 191 that clip from the bottom around at least a majority of the circumference of the joints 195 of the chain 197 and straight sections 192 connecting the curved sections 191. Each joint 195 includes a pair of rocker pins 198, 199. The wire may be installed from the inside of the chain without the need for weaving. Thus, the installation is simplified, thereby reducing the cost.

Figure 10:
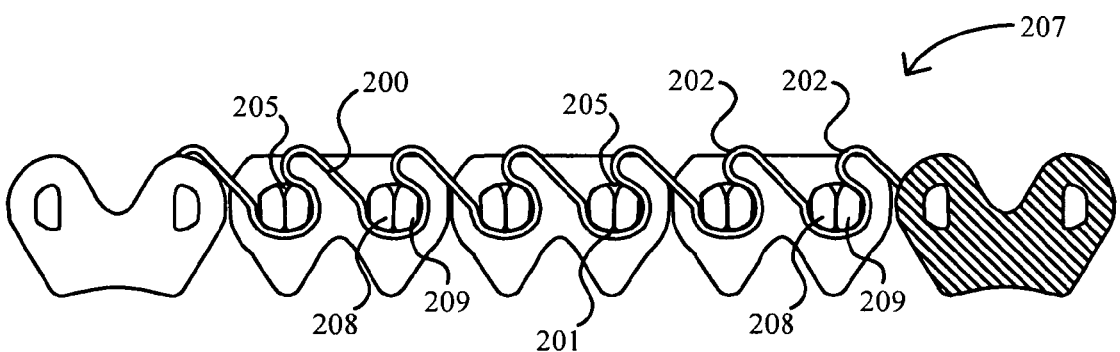
FIG. 10 shows a side view of a portion of a rocker chain in a seventeenth embodiment of the present invention.

FIG. 10 shows a wire 200, which wraps around a larger portion of each joint 205 of the chain 207 such that the wire is retained on the pins better than the embodiment of FIG. 9 while still being installed from the inside of the chain without the need for weaving. The wire 200 includes curved sections 201 that clip from the bottom around at least a majority of the circumference of the joints 205 of the chain 207 and fishhook-shaped sections 202 connecting the curved sections 201. Each joint 205 includes a pair of rocker pins 208, 209. In this embodiment, the wire is formed in the shape of fishhooks 202, which provide a greater elastic resistance to rotation of the joints than the straight sections of the previous embodiment and make the wire easy to install on the chain and hard to fall off the chain.

Figure 11:
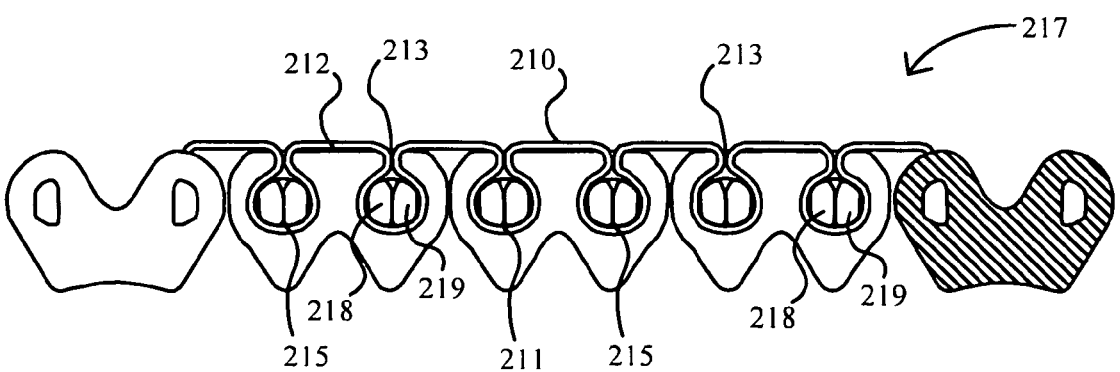
FIG. 11 shows a side view of a portion of a rocker chain in an eighteenth embodiment of the present invention.

FIG. 11 shows a wire 210 which wraps substantially completely around each joint 215 of the chain 217. The wire 210 includes curved sections 211 that clip from the bottom around at least a majority of the circumference of the joints 215 of the chain 217 and straight sections 212 connecting the curved sections 211. Each joint 215 includes a pair of rocker pins 218, 219. Although the wire 210 is similarly shaped to the wire 190 in the embodiment of FIG. 9, the wire comes to a choke point 213, where it contacts or nearly contacts itself, at the top of each joint 215. The choke point 213 closes as the chain backbends, and thus this embodiment is more effective in constraining the chain from backbending. The choke point opens as the chain wraps on the sprocket, so the wire provides less resistance during engagement with a sprocket. This structure suppresses tight resonance without significantly losses in transfer efficiency to the sprocket. This wire may also be installed from the inside of the chain without the need for weaving and is maintained on the joints very well.

In the above-mentioned embodiments, the wire is disposed between the outermost inside link and the adjacent outside link, but the wire may be disposed between the inside links adjacent to each other in a chain width direction.

Although the chains in the embodiments of FIGS. 1-7 are shown and described as having a single connecting pin in each joint and the chains in the embodiments of FIGS. 8-11 are shown and described as having rocker pins, the wires of any embodiments of the present invention may be used in either type of chain within the spirit of the present invention.

Figure 12:
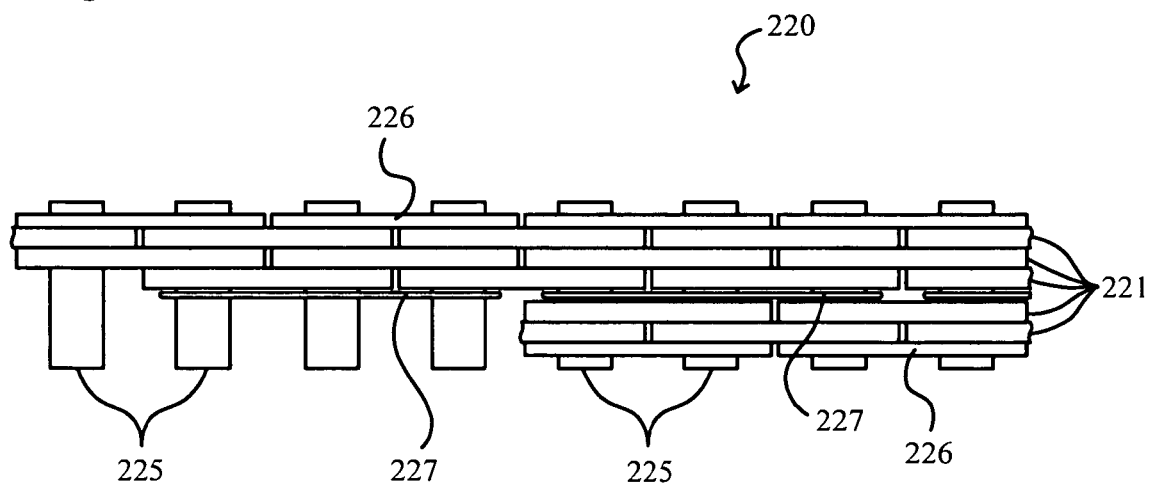
FIG. 12 shows a top plan view of a portion of a silent chain with wires inserted between links in an embodiment of the present invention.

FIG. 12 shows a silent chain 220 constructed from a plurality of rows of interleaved inside links 221 pivotably connected to each other by connecting pins 225 inserted into the pin apertures. The silent chain 220 also has outside links 226 with pin apertures and disposed outside the outermost inside links 221 and fixedly connected to the ends of the connecting pins 225. Alternatively, the connecting pins 225 may be pairs of rocker pins in each pin aperture to form each joint. In contrast to the embodiment of FIG. 1, wires 227 are provided between the rows of inside links 221. The wires 227 may be sandwiched between any adjacent rows of inside links 221 within the spirit of the present invention.

Figure 13:
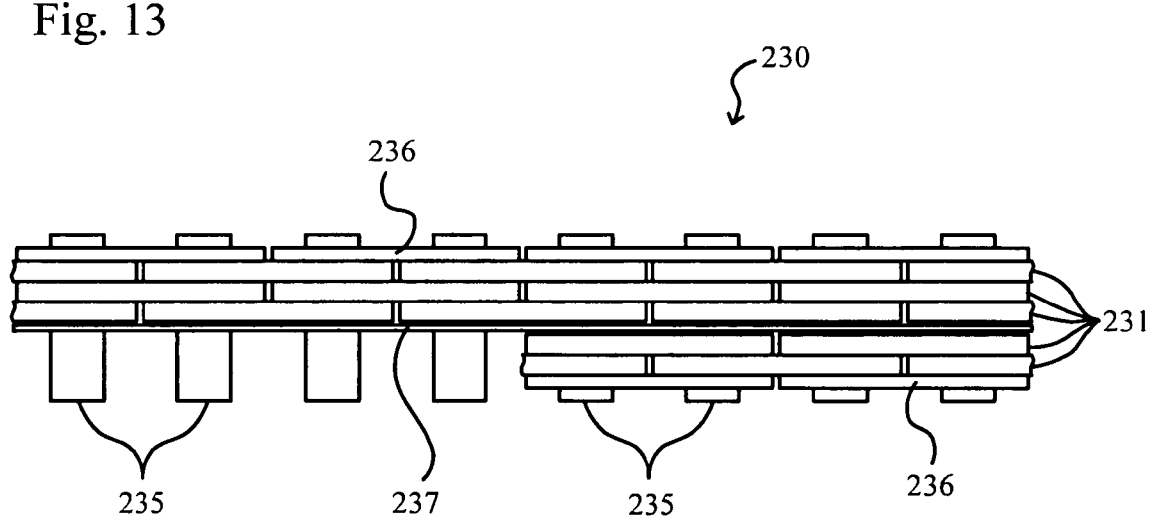
FIG. 13 shows a top plan view of a portion of a silent chain with a continuous wire inserted between links in an embodiment of the present invention.

FIG. 13 shows a silent chain 230 constructed from a plurality of rows of interleaved inside links 231 pivotably connected to each other by connecting pins 235 inserted into the pin apertures. The silent chain 230 also has outside links 236 with pin apertures and disposed outside the outermost inside links 231 and fixedly connected to the ends of the connecting pins 235. Alternatively, the connecting pins 235 may be pairs of rocker pins in each pin aperture to form each joint. Similar to the embodiment of FIG. 12, a continuous wire 237 is provided between two rows of inside links 231. The wire 237 may be sandwiched between any adjacent rows of inside links 231 within the spirit of the present invention.

Those skilled in the art to which the invention pertains may make modifications and other embodiments employing the principles of this invention without departing from its spirit or essential characteristics particularly upon considering the foregoing teachings. The described embodiments and examples are to be considered in all respects only as illustrative and not restrictive. The scope of the invention is, therefore, indicated by the appended claims rather than by the foregoing description. Consequently, while the invention has been described with reference to particular embodiments and examples, modifications of structure, sequence, materials and the like would be apparent to those skilled in the art, yet fall within the scope of the invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A power transmission chain comprising:
a plurality of links, each link having a pair of pin apertures connected to each other by at least one connecting pin inserted into each of the pin apertures, thereby forming a joint; and
a bending-restraining mechanism comprising a wire extending in a lengthwise direction along the chain and engaging at least three adjacent joints of the chain comprising an inner joint and a pair of outer joints;
wherein the wire is formed such that:
the wire comprises a curved section clipped around at least a majority of a circumference of at least one of the at least three adjacent joints; and
the wire elastically deforms when an inside link rotates around the inner joint in a first direction from a linearly extending state, the wire thereby applying a bending resistance to the inside link during articulation of the chain.

2. The power transmission chain of claim 1, wherein the power transmission chain is a rocker chain and the at least one connecting pin comprises a first rocker pin and a second rocker pin.

3. The power transmission chain of claim 1, wherein the wire comprises a plurality of curved sections, each curved section being clipped around at least a majority of a circumference of one of the at least three adjacent joints.

4. The power transmission chain of claim 3, wherein the wire comprises a plurality of fishhook shapes, each fishhook shape being formed in a connecting section of the wire connecting a pair of adjacent curved sections.

5. The power transmission chain of claim 3, wherein each curved section forms a choke point above the respective joint of the chain.

6. The power transmission chain of claim 5, wherein each choke point is formed such that the choke point closes to provide a resistance to backbending when the chain backbends at the respective joint.

7. The power transmission chain of claim 1, wherein the wire is installable from an inside of the chain after an assembly of the plurality of links.

8. The power transmission chain of claim 1, wherein a primary force applied by the wire at one of the joints is in a direction perpendicular to an axis of the joint.

9. The power transmission chain of claim 1, wherein the wire is formed such that a predetermined bias due to a bending deformation of the wire is applied to the inside link when the chain is extended linearly.

10. The power transmission chain of claim 1, wherein the wire engages all of the joints of the plurality of links of the chain.

11. The power transmission chain of claim 1, wherein the wire is continuous around the chain with no ends.

12. The power transmission chain of claim 1, wherein the wire is located between and adjacent to an outermost row of inside links and a row of outside links of the chain.

13. The power transmission chain of claim 1, wherein the wire is located between and adjacent to a first row of inside links and a second row of inside links of the chain.

14. A power transmission chain comprising:
a plurality of links, each link having a pair of pin apertures connected to each other by at least one connecting pin inserted into each of the pin apertures, thereby forming a joint; and
a bending-restraining mechanism comprising a wire extending substantially along a length of the chain and engaging at least three adjacent joints of the chain comprising an inner joint and a pair of outer joints;
wherein the wire is formed such that:
the wire elastically deforms when an inside link rotates around the inner joint in a first direction from the linearly extending state, the wire thereby applying a bending resistance to the inside link during articulation of the chain; and
a predetermined bias due to a bending deformation of the wire is applied to the inside link when the chain is extended linearly.

15. The power transmission chain of claim 14, wherein the power transmission chain is a rocker chain and the at least one connecting pin comprises a first rocker pin and a second rocker pin.

16. The power transmission chain of claim 14, wherein a primary force applied by the wire at one of the joints is in a direction perpendicular to an axis of the joint.

17. The power transmission chain of claim 14, wherein the wire is located between and adjacent to an outermost row of inside links and a row of outside links of the chain.

18. The power transmission chain of claim 14, wherein the wire is located between and adjacent to a first row of inside links and a second row of inside links of the chain.

19. A power transmission chain comprising:
- a plurality of links, each link having a pair of pin apertures connected to each other by at least one connecting pin inserted into each of the pin apertures, thereby forming a joint; and
- a bending-restraining mechanism comprising a wire extending in a lengthwise direction along the chain and engaging at least three adjacent joints of the chain comprising an inner joint and a pair of outer joints;
- wherein the wire is formed such that:
  - the wire weaves alternatively over and under the joints; and
  - the wire elastically deforms when an inside link rotates around the inner joint in a first direction from a linearly extending state, the wire thereby applying a bending resistance to the inside link during articulation of the chain.

20. The power transmission chain of claim 19, wherein the power transmission chain is a rocker chain and the at least one connecting pin comprises a first rocker pin and a second rocker pin.

21. The power transmission chain of claim 19, wherein a primary force applied by the wire at one of the joints is in a direction perpendicular to an axis of the joint.

22. The power transmission chain of claim 19, wherein the wire is formed such that it is substantially linear prior to being weaved between the joints.

23. The power transmission chain of claim 19, wherein the wire engages all of the joints of the plurality of links of the chain.

24. The power transmission chain of claim 19, wherein the wire is located between and adjacent to an outermost row of inside links and a row of outside links of the chain.

25. The power transmission chain of claim 19, wherein the wire is located between and adjacent to a first row of inside links and a second row of inside links of the chain.

* * * * *